United States Patent
Dudda et al.

(10) Patent No.: US 10,433,176 B2
(45) Date of Patent: Oct. 1, 2019

(54) DISCARDING A DUPLICATE PROTOCOL DATA UNIT ASSOCIATED WITH A DATA TRANSMISSION VIA A FIRST SIGNALING RADIO BEARER OR A SECOND SIGNALING RADIO BEARER

(71) Applicant: Telefonaktiebolaget LM Ericsson (publ), Stockholm (SE)

(72) Inventors: Torsten Dudda, Aachen (DE); Stefan Wager, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 486 days.

(21) Appl. No.: 15/035,729

(22) PCT Filed: Nov. 11, 2014

(86) PCT No.: PCT/EP2014/074286
§ 371 (c)(1),
(2) Date: May 10, 2016

(87) PCT Pub. No.: WO2015/067823
PCT Pub. Date: May 14, 2015

(65) Prior Publication Data
US 2016/0302075 A1    Oct. 13, 2016

Related U.S. Application Data

(60) Provisional application No. 61/902,528, filed on Nov. 11, 2013.

(51) Int. Cl.
*H04W 12/10* (2009.01)
*H04L 29/06* (2006.01)
(Continued)

(52) U.S. Cl.
CPC .......... *H04W 12/10* (2013.01); *H04L 63/123* (2013.01); *H04L 63/162* (2013.01); *H04W 36/0069* (2018.08); *H04W 80/02* (2013.01)

(58) Field of Classification Search
CPC ..................................................... H04W 12/10
(Continued)

(56) References Cited

U.S. PATENT DOCUMENTS

| | | | |
|---|---|---|---|
| 7,099,327 B1 * | 8/2006 | Nagarajan | H04Q 11/0478 370/394 |
| 7,593,408 B2 * | 9/2009 | Rezaiifar | H04L 1/1841 370/394 |

(Continued)

FOREIGN PATENT DOCUMENTS

| | | |
|---|---|---|
| EP | 2 086 150 A2 | 8/2009 |
| EP | 2 136 501 A2 | 12/2009 |

OTHER PUBLICATIONS

International Search Report and Written Opinion of the International Searching Authority, Application No. PCT/EP2014/074286, dated Feb. 4, 2015.

(Continued)

*Primary Examiner* — Farid Homayounmehr
*Assistant Examiner* — Thanh T Le
(74) *Attorney, Agent, or Firm* — Patent Portfolio Builders, PLLC

(57) ABSTRACT

Methods, devices, communication systems, and computer program products for discarding a duplicate protocol data unit associated with a data transmission via a first signaling radio bearer or a second signaling radio bearer are described. A method for discarding a duplicate protocol data unit associated with a data transmission via a first signaling radio bearer or a second signaling radio bearer is performed by a device. The method includes receiving a protocol data unit, (Continued)

verifying an integrity of the received protocol data unit in an integrity verification procedure, determining whether the successfully integrity verified protocol data unit is a duplicate protocol data unit, and discarding the protocol data unit based on determining that the successfully integrity verified protocol data unit is a duplicate protocol data unit.

17 Claims, 12 Drawing Sheets

(51) Int. Cl.
*H04W 80/02* (2009.01)
*H04W 36/00* (2009.01)

(58) Field of Classification Search
USPC .............................................. 726/2
See application file for complete search history.

(56) References Cited

U.S. PATENT DOCUMENTS

| | | | | |
|---|---|---|---|---|
| 7,716,379 | B2* | 5/2010 | Ruan | G06F 13/387 709/224 |
| 8,646,090 | B1* | 2/2014 | Gadde | H04L 12/6418 726/13 |
| 8,958,422 | B2* | 2/2015 | Celik | H04L 1/1841 370/389 |
| 2004/0085932 | A1* | 5/2004 | Jiang | H04W 76/27 370/332 |
| 2010/0146354 | A1* | 6/2010 | Zhang | H04L 1/0025 714/749 |
| 2011/0188408 | A1 | 8/2011 | Yi et al. | |
| 2011/0280240 | A1* | 11/2011 | Yamagaki | H04L 1/1883 370/389 |
| 2013/0148490 | A1* | 6/2013 | Yi | H04B 7/155 370/216 |
| 2013/0159769 | A1* | 6/2013 | Buban | G06F 1/14 714/20 |
| 2013/0216043 | A1* | 8/2013 | Ginzboorg | H04W 12/02 380/270 |
| 2015/0040195 | A1* | 2/2015 | Park | H04W 12/06 726/4 |
| 2015/0098570 | A1* | 4/2015 | Wentink | H04L 63/12 380/270 |
| 2017/0270065 | A1* | 9/2017 | Ruan | G06F 13/36 |

OTHER PUBLICATIONS

3GPP, Technical Specification—"3rd Generation Partnership Project; Technical Specification Group Radio Access Network; Evolved Universal Terrestrial Radio Access (E-UTRA); Packet Data Convergence Protocol (PDCP) specification (Release 11)", 3GPP TS 36.323 V11.2.0 (Mar. 2013), 27 pp.

3GPP, Technical Report—3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), 3GPP TR 36.842 V0.2.0 (May 2013), 38 pp.

Ericsson, "L2 transport of SRBs and relation to RLF handling", Agenda Item: 7.2.2.2, Document for: Discussion, Decision, Tdoc R2-134221, 3GPP TSG-RAN WG2 #84, San Francisco, USA, Nov. 11-15, 2013, 5 pp.

Ericsson, "A common user plane architecture for dual connectivity", Agenda Item: 7.2.2.1, Document for: Discussion, Decision, Tdoc R2-134224, 3GPP TSG-RAN WG2 #84, San Francisco, USA, Nov. 11-15, 2013, 4 pp.

Ericsson et al., "Benefits of RRC diversity in different deployment scenarios", Agenda Item: 7.2.1, Document for: Discussion, Decision, Tdoc R2-131664, 3GPP TSG-RAN WG2 #82, Fukuoka, Japan, May 20-24, 2013, 4 pp.

LG Electronics, Change Request—"Update of eUtran PDCP specification", 3GPP Draft; R2-080330_CR-V808_36323-800, Jan. 7, 2008, 36 pp. (XP050138187).

Qualcomm Incorporated, "[83#13][LTE/Het-Net] Early T310 termination", Agenda item: 7.1.3.1, Document for: Discussion and Decision, R2-133073, 3GPP TSG-RAN WG2 meeting #83bis, Ljubljana, Slovenia, Oct. 7-11, 2013, 9 pp.

* cited by examiner

DISCARDING A DUPLICATE PROTOCOL DATA UNIT ASSOCIATED WITH A DATA TRANSMISSION VIA A FIRST SIGNALING RADIO BEARER OR A SECOND SIGNALING RADIO BEARER

CROSS REFERENCE TO RELATED APPLICATION

This application is a 35 U.S.C. § 371 national stage application of PCT International Application No. PCT/EP2014/074286, filed on Nov. 11, 2014, which itself claims the benefit of U.S. provisional Application No. 61/902,528, filed on Nov. 11, 2013, the disclosure and content of both of which are incorporated by reference herein in their entireties. The above-referenced PCT International Application was published in the English language as International Publication No. WO 2015/067823 A1 on May 14, 2015.

TECHNICAL FIELD

The present invention relates to discarding a duplicate protocol data unit associated with a data transmission via a first signaling radio bearer or a second signaling radio bearer, and corresponding methods, devices, a communication system, computer programs and computer program products.

BACKGROUND

A user equipment (UE) may be attached via a signaling radio bearer (SRB) to an access node of a radio access network such as en eNodeB of an LTE radio access network. In order to encounter for fraudulent attacks by interceptors of a packet transmitted via the SBR, the receiving user equipment may perform an integrity verification procedure. Such a verification procedure is known from TS 36.323 V11.2.0 (2013-03-18), section 5.1.2.2, in which it is described that a protocol entity of the user equipment may perform following steps for a received Packet Data Convergence Protocol (PDCP) data unit:

The receiving user equipment may firstly decipher and verify integrity protection of the received protocol data unit (PDU). A PDCP sequence number (SN) included in the received PDU is compared against the next expected PDCP SN and the hyper frame number (HFN) is adjusted appropriately to account for PDCP SN wrap around, i.e. a restart of counting of the SN from zero to a maximum available SN number.

Afterwards the integrity verification procedure in the PDCP receiving user equipment takes a parameter called COUNT into account. The parameter COUNT is based on a first parameter called Next_PDCP_RX_SN which is the PDU SN expected by the user equipment to be the next SN of the received PDU in view of the previously received PDU SN, and a second parameter called RX_HFN which corresponds to the HFN assumed to be the valid one in the receiving user equipment. The verification procedure is successful, if the accordingly calculated parameter COUNT has the same value as the COUNT value used by the transmitting entity for integrity protection and included in the received PDU, and if the PDU's content, for example the payload transmitted in the PDU, are equal.

If the above described deciphering and integrity verification is successful, the local variables RX_HFN and Next_PDCP_RX_SN are updated in the user equipment according to the actual received PDCP SN and the PDCP SDU is delivered to respective protocol entities of a higher layer. In this respect, SDU may denote a service data unit. If the integrity verification is not successful, hence fails, the PDCP SDU is discarded and a notification is sent to the protocol entity of a higher layer or to the protocol entities of the higher layers, which notification indicates that the integrity verification has failed. For completeness, section 5.1.2.2 of TS 36.323 V11.2.0 (2013-3-18) defines the above mechanism as a pseudocode and reads as follows:

For SRBs, at reception of a PDCP Data PDU from lower layers, the UE shall:

- if received PDCP SN < Next_PDCP_RX_SN:
  - decipher and verify the integrity of the PDU (if applicable) using COUNT based on RX_HFN + 1 and the received PDCP SN as specified in the subclauses 5.6 and 5.7, respectively;
- else:
  - decipher and verify the integrity of the PDU (if applicable) using COUNT based on RX_HFN and the received PDCP SN as specified in the subclauses 5.6 and 5.7, respectively;
- if integrity verification is applicable and the integrity verification is passed successfully; or
- if integrity verification is not applicable:
  - if received PDCP SN < Next_PDCP_RX_SN:
    - increment RX_HFN by one;
  - set Next_PDCP_RX_SN to the received PDCP SN + 1;
  - if Next_PDCP_RX_SN > Maximum_PDCP_SN:
    - set Next_PDCP_RX_SN to 0;
    - increment RX_HFN by one;
  - deliver the resulting PDCP SDU to upper layer;
- else, if integrity verification is applicable and the integrity verification fails:
  - discard the received PDCP Data PDU;
  - indicate the integrity verification failure to upper layer.

Currently, dual connectivity and RRC message transmission diversity is discussed. In this respect, dual connectivity may relate to a communication scenario as seen from the UE's perspective in which the UE may simultaneously receive from and transmit to at least two different network points, for example access nodes. Dual connectivity is a feature being standardized within the umbrella work of a study item called "small cell enhancements" of 3GPP Rel-12. RRC message transmission diversity or, as it may be shortly called RRC transmission diversity, may be enabled by dual connectivity and may may relate to a communication scenario in which control signaling can be transmitted via at least two connections between a network and a UE. In this regard, control signaling may be used for controlling a receiving entity, for example the UE. Control signaling may be considered as payload for lower layer protocol data units. Control signaling may comprise RRC messages to be used for controlling the UE.

In such a LTE based communication scenario, two different network points are usually denoted as Master eNodeB (MeNB) and Secondary eNdeB (SeNB). It is assumed that the RRC protocol, which is responsible of configuring the UE, is terminated within the MeNB. Referring to FIG. 1, a communication scenario comprising a MeNB 12 and a SeNB 14 may be illustrated. The MeNB 12 may be an embodiment of a network node of a communication network, for example a radio access node of a radio access network. The SeNB 14 may be an embodiment of a further network node of the communication network, for example a further radio access node of the radio access network. As illustrated, the MeNB 12 may comprise Media Access Protocol (MAC) protocol layers 16a, 16b, Radio Link Control (RLC) protocol layers 18a, 18b, PDCP protocol layers 20a, 20b, and a Radio Resource Control (RRC) protocol layer 22. The SeNB 14 may comprise MAC protocol layers 24a, 24b, RLC protocol layers 26a, 26b and a PDCP protocol layer 28. According to some embodiments, the SeNB 14 may only comprise the MAC protocol layers 24a, 24b and RLC protocol layers 26a, 26b. According to some embodiments, the MeNB 12 and/or the SeNB 14 may comprise one MAC protocol layer instead of the two MAC protocol layers 16a, 16b, 24a, 24b. A signaling radio bearer may extend between the RRC protocol layer 22 of the MeNB 12 and a UE, and in particular between the RRC protocol layer 22 of the MeNB 12 and a RRC protocol layer of the UE. The signaling radio bearer may be split internally of the MeNB 12 at or below PDCP protocol layer level when seen from a protocol layer perspective, i.e. at or below the PDCP protocol layer 20b, and may utilize the RLC protocol layer 18b and the MAC protocol layer 16b of the MeNB 12 and the RLC protocol layer 26a and the MAC protocol layer 24a of the SeNB 14. Hence, a protocol entity of the PDCP protocol layer 20b in MeNB 12 may be connected with a protocol entity of the RLC protocol layer 26a in the SeNB 14 via a backhaul channel via which the splitted portion of the signaling radio bearer may extend. FIG. 1 illustrates a combined protocol architecture for Release 12 supporting three types of radio bearers, namely:

| | |
|---|---|
| Type 1: Bearer served by MeNB | (left in FIG. 1) |
| Type 2: Bearer served by SeNB | (right in FIG. 1) |
| Type 3: Bearer split over both MeNB and SeNB | (middle in FIG. 1) |

The type 1 bearer may utilize the dotted protocol layers 16a, 18a, 20a in the MeNB 12. The type 2 bearer may utilize the vertically dashed protocol layers 24b, 26b, and 28b in the SeNB 14. The type 3 bearer may utilize the diagonally striped protocol layers 16b, 18b, 20b, 24a, 26a in the MeNB 12 and the SeNB 14. It may be noted that from a UE perspective, the UE can be regarded to be connected to the MeNB 12 via a first signaling radio bearer and to the SeNB 14 via a second signaling radio bearer when seen from a protocol layer perspective below RRC and can be seen to be connected to the MeNB 12 and the SeNB 14 via one signaling bearer at RRC protocol layer level or in other words above a PDCP protocol layer level. For completeness of the description, an arrow 30 in the Figure may indicate an incoming data flow for the MeNB 12, for example from an Internet Protocol (IP) layer. An arrow 32 may indicate an incoming data flow for the SeNB 14. An arrow 34 may indicate a data flow via the backhaul link between the MeNB 12 and the SeNB 14.

To convey RRC messages, signaling radio bearers (SRBs) are used, which may implement the bearer types described above. The simplest case is to transport PDUs via an SRB with type 1, for example to use the SBR via the MeNB link to the UE only. In this case the SRB is terminated in the MeNB. Transport of PDUs may be performed via the dotted protocol layers 16a, 18a, 20a. For type 2, RRC messages need to be transported from MeNB to SeNB and then via an SRB from SeNB to the UE. In this case the SRB is terminated in the SeNB. Transport of PDUs may be performed via the vertically dashed protocol layers 24b, 26ba, 28. To support diversity for the RRC message transmission, for example for an increase of transmission reliability, the split-bearer architecture (type 3) can be used for the SRB. Transport of PDUs may be performed via the diagonally striped protocol layers 16b, 18b, 20b and 24a, 26a by also utilizing the backhaul channel. In this approach, it is envisaged that the PDCP PDU corresponding to the RRC message is duplicated such that a copy is sent on both MeNB and SeNB link to the UE. FIG. 2 illustrates such a copying PDCP PDU containing a RRC message to be transmitted via both MeNB and SeNB link.

In particular, FIG. 2 may illustrate a communication scenario comprising a MeNB 12, a SeNB 14 and a UE 36 connectable to the MeNB 12 and the SeNB 14. The MeNB 12 can be the MeNB illustrated in FIG. 1, and the SeNB can be the SeNB illustrated in FIG. 1. As illustrated, the MeNB 12 may comprise a MAC protocol layer 16b, a RLC protocol layer 18b, a PDCP protocol layer 20b, and a RRC protocol layer 22. The SeNB 14 may comprise a MAC protocol layer 24a and a RLC protocol layer 26a. The UE 36 may comprise MAC protocol layers 38a, 38b, RLC protocol layers 40a, 40b, a PDCP protocol layer 42, and a RRC protocol layer 44. A signaling radio bearer may extend between the RRC protocol layer 22 of the MeNB 12 and the RRC protocol layer 44 of the UE 36. The signaling radio bearer may be indicated in the Figure by the thick line. The signaling radio bearer may be split at or below the PDCP protocol layer level such that a splitted portion of the signaling radio bearer may extend between the RRC protocol layer 22 of the MeNB 12 and the RRC protocol layer 44 of the UE 36 via the RLC protocol layer 26a and the MAC protocol layer 24a of the SeNB 14. Form a perspective of the UE 36 below the RRC layer level, the UE 36 may be regarded to be connected to the MeNB 12 via a first signaling radio bearer and to the SeNB 14 via a second signaling radio bearer. Packet duplication of PDCP protocol data units (PDU) may occur at a point 46 between the RLC protocol layer 18b and the PDCP protocol layer 20b of the MeNB 12. It is noted that the point 46 may be also part of the PDCP layer 20b. Such a protocol data unit 48 comprising a sequence number (SN) X is indicated in the Figure by "PDCP PDU SN X". The PDUs and the duplicated PDUs are transmitted to the UE 36 via a MeNB link 50 and via a SeNB link 52, respectively.

Since perfect simultaneous coverage of both the MeNB cell and SeNB cell cannot always be assumed, reception of RRC messages via a SRB on the MeNB cell only might introduce delays due to lower layer failures or might fail entirely. This may degrade signaling and mobility robustness. For the envisaged split-SRB protocol architecture (type 3 in FIG. 1), to support diversity of RRC message transmission, PDCP PDUs are duplicated. Currently, duplication detection and discard is not supported intentionally by PDCP. The PDCP procedure described above may lead in case of duplicate received PDCP PDUs to the discard of those duplicate PDUs, but since this discard is part of PDCP security functionality and intended to detect so called "replay attack" in which an interceptor tries to send alternated PDU with same SN after original PDU, an indication of integrity verification failure may be send to upper layers. This registration of a security breach may be unnecessary and may be wrong in case of duplicate received PDCP PDUs.

SUMMARY

It is an object to provide measures with which duplicate protocol data units received via a first or second signal bearer can be accurately detected and discarded, particularly while avoiding incorrect indications of integrity verification failures in case of received duplicate protocol data units. It is also an object to provide corresponding methods, devices, computer programs, and computer program products, and a corresponding communication system.

The objects defined above are solved by embodiments according to the independent claims.

According to a first exemplary embodiment, a method for discarding a duplicate protocol data unit associated with a data transmission via a first signaling radio bearer or a second signaling radio bearer is provided. The method is performed by a device and comprises receiving a protocol data unit, and verifying an integrity of the received protocol data unit in an integrity verification procedure. The method also comprises determining whether the successfully integrity verified protocol data unit is a duplicate protocol data unit, and discarding the protocol data unit, if the successfully integrity verified protocol data unit is a duplicate protocol data unit.

According to a second exemplary embodiment, a device for a communication network and for discarding a duplicate protocol data unit associated with a data transmission via a first signaling radio bearer or a second signaling radio bearer is provided. The device comprises an interface for communicating with the communication network, and processing means operative to receive a protocol data unit, and to verify an integrity of the received protocol data unit in an integrity verification procedure. The processing means is also operative to determine whether the successfully integrity verified protocol data unit is a duplicate protocol data unit, and to discard the protocol data unit, if the successfully integrity verified protocol data unit is a duplicate protocol data unit.

According to a third exemplary embodiment, a method for discarding a duplicate protocol data unit associated with a data transmission via a first signaling radio bearer or a second signaling radio bearer is provided. The method is performed by a device and comprises receiving a protocol data unit, and verifying an integrity of the received protocol data unit in an integrity verification procedure. The method also comprises discarding the not successfully integrity verified protocol data unit, determining whether the discarded protocol data unit is a duplicate protocol data unit, and omitting to indicate an integrity verification failure for the discarded protocol data unit, if the discarded protocol data unit is a duplicate protocol data unit.

According to a fourth exemplary embodiment, a device for a communication network and for discarding a duplicate protocol data unit associated with a data transmission via a first signaling radio bearer or a second signaling radio bearer is provided. The device comprises an interface for communicating with the communication network, and processing means operative to receive a protocol data unit, and to verify an integrity of the received protocol data unit in an integrity verification procedure. The processing means is also operative to discard the not successfully integrity verified protocol data unit, to determine whether the discarded protocol data unit is a duplicate protocol data unit, and to omit to indicate an integrity verification failure for the discarded protocol data unit, if the discarded protocol data unit is a duplicate protocol data unit.

According to a fifth exemplary embodiment, a communication system is provided. The communication system comprises the device according to the second exemplary embodiment or the fourth exemplary embodiment and a network node configured to send the protocol data unit to the device.

According to a sixth exemplary embodiment, a computer program is provided. The computer program is loadable onto at least one processor of a device and comprises code for executing a method according to the first and/or third exemplary embodiments.

According to a seventh exemplary embodiment, a computer program product is provided. The computer program product comprises a computer program according to the sixth exemplary embodiments.

Further embodiments are described in the dependent claims.

The foregoing and other objects, features and advantages of the embodiments will become more apparent in the following detailed description of embodiments as illustrated in the accompanying drawings.

DETAILED DESCRIPTION

Figure 1:
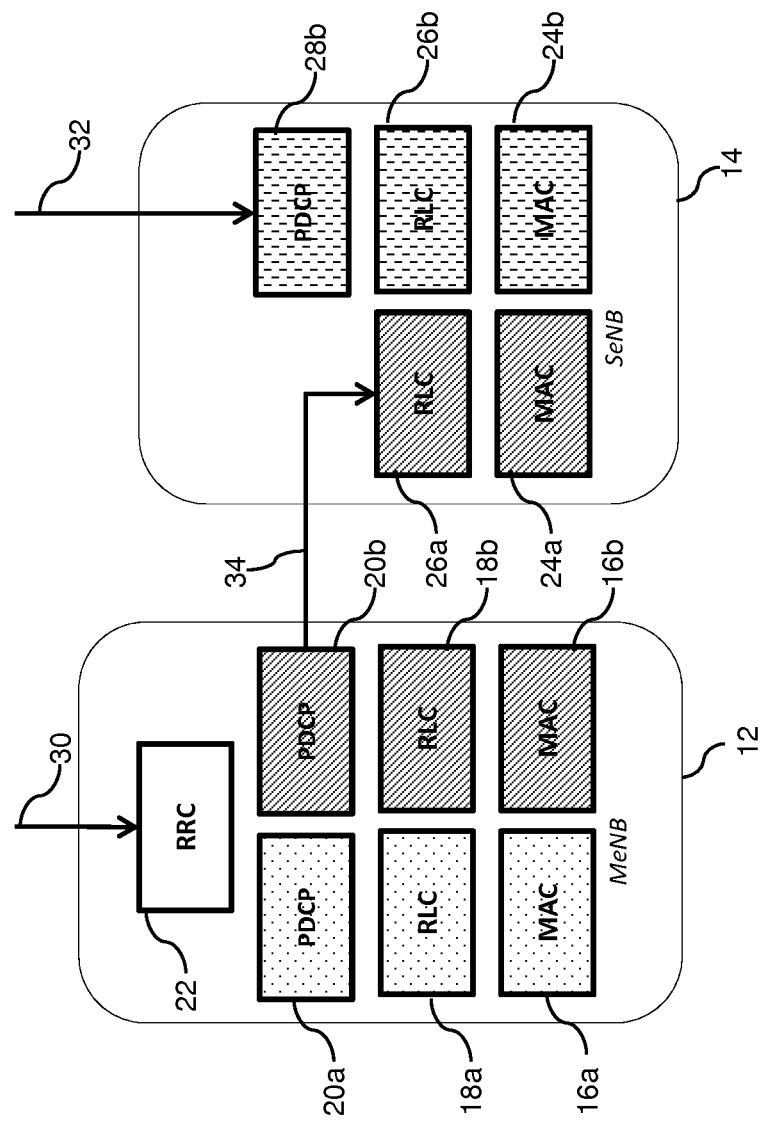
FIG. 1 is a block diagram illustrating a communication architecture of a communication network on a protocol level.

It is noted that the illustration in the drawings is schematic. Similar or identical elements are steps are denoted by the same reference numeral or by reference numerals which are different from one another within the first digit.

In the following, concepts according to the exemplary embodiments will be described in more detail. However, although some embodiments are described within the context of LTE, hence E-UTRAN, it is to be understood that the problems and solutions described herein are equally applicable to wireless access networks and user equipments (UEs) implementing other access technologies and standards, for example LTE-A, UMTS, WiFi and including those different from 3GPP. LTE is used as an example technology in which the present embodiments can be suitably applied, and the example of LTE in the following description is particularly useful for understanding the problem and solutions solving the problem.

It is to be noted that definitions presented in the section "Background" may equally apply to embodiments of the invention.

A device may be connected to first and second network nodes of a communication network, for example first and second access nodes of a radio access network, via respective first and second signaling radio bearers. Exemplary embodiments of the radio access nodes may be eNodeBs of a LTE radio access network. One of the first or second signaling radio bearers, for example the first signaling radio bearer or the second signaling radio bearer, may further commence from the respective access node to the respective other access node.

Within the context of the present application, the term "signaling radio bearer" may particularly denote a transmission context with defined properties such as delay, quality of service and latency. The term "first signaling radio bearer" and the term "second signaling radio bearer" may particularly denote individual or separate signaling bearers or splitted portions of a same bearer which may be terminated in one same protocol entity associated with a protocol layer in a device. As explained above, such separate signaling radio bearers or splitted signaling radio bearers may origin in one radio access node. In a case of separate signaling radio bearers, the first network node may be connected to the second network node via a backhaul link. Separate signaling radio bearers or splitted signaling radio bearers may enable duplicate data transmission towards the device for enabling transmission diversity, i.e. signaling and payload transmission via multiple transmission links, and multiple connectivity of the device towards the communication network. Such a protocol layer may be embodied as a packet data convergence protocol layer, PDCP layer.

The term "duplicate protocol data unit" may particularly denote a protocol data unit which may be, at least regarding certain characteristics of the protocol data unit, identical to a further protocol data unit. For example, a duplicate protocol data unit may correspond to a copy of the protocol data unit.

According to some embodiments, the device may comprise or use at least one protocol layer. In some embodiments, the device may comprise a stack of at least two layered protocol layers. The device may use the at least one protocol layer or the stack, respectively, to receive and send a protocol data unit via a signaling radio bearer, for example the first or second signaling radio bearer. For example, the device may process a protocol data unit and may provide the processed protocol data unit to an upper protocol layer of the stack at receipt of the protocol data unit and /or may provide the processed protocol data unit to a lower protocol layer of the stack, in order to send the protocol data unit. Each protocol layer may be associated with a respective protocol entity adapted to handle the functionalities of the associated protocol layer.

According to some embodiments, the device may comprise or use at least one further protocol layer. In some embodiments, the device may comprise a further stack of at least two layered protocol layers. This at least one further protocol layer or this further stack may be similarly embodied and may comprise similar functionalities as the above described at least one protocol layer and the stack of protocol layers, respectively, but may be used for transmission and reception of a protocol data unit via a further, different signaling radio bearer. I.e. the stack of protocol layers may be employed in association with the first signaling radio bearer, and the further stack of protocol layers may be employed in association with the second signaling radio bearer.

Figure 2:
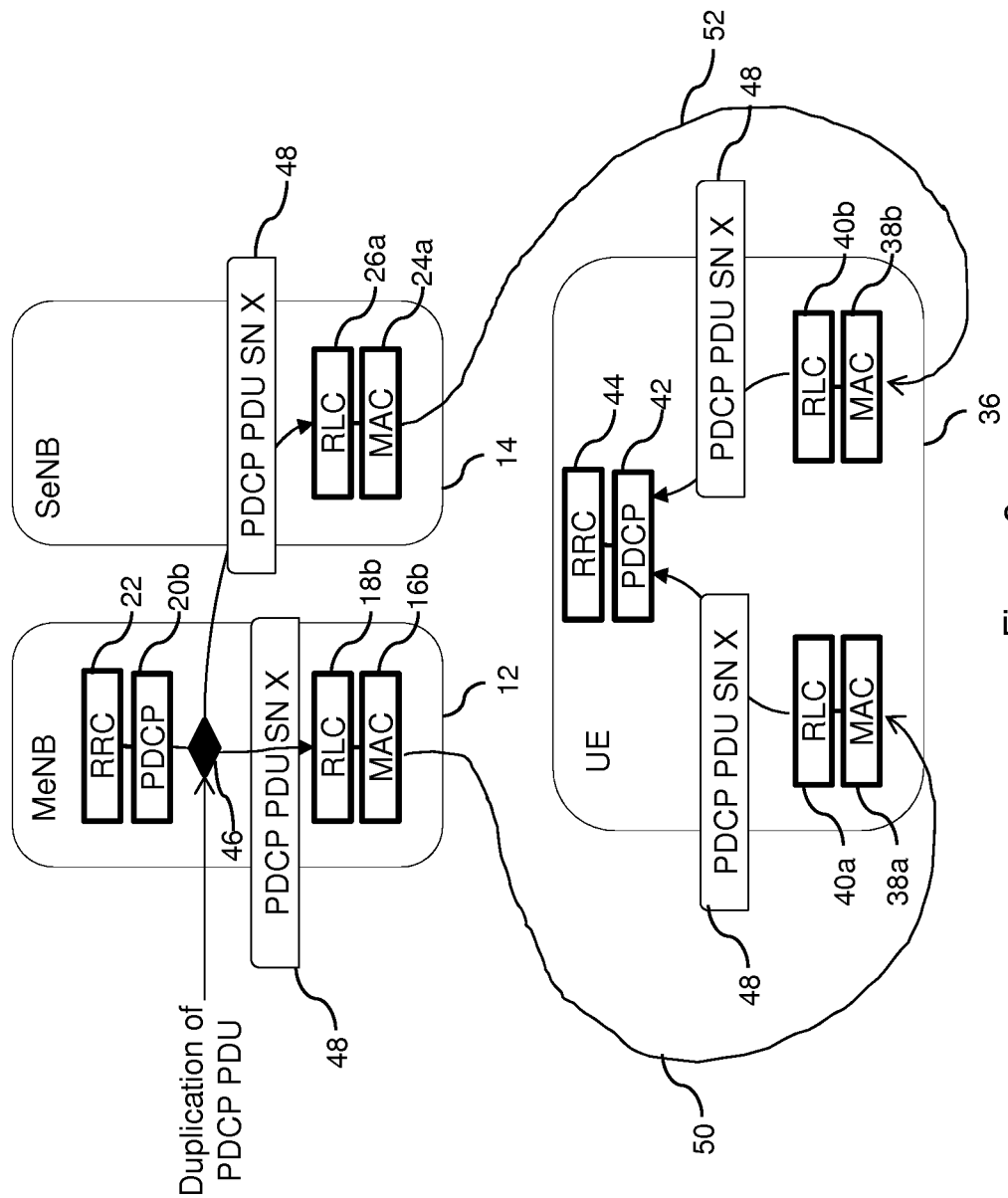
FIG. 2 is a block diagram illustrating a communication scenario according to concepts of the present embodiments on a protocol level.

For example, the device may correspond to the UE 36 illustrated in FIG. 2, and the first and second network nodes may correspond to the MeNB 12 and the SeNB 14 illustrated in FIG. 2. A signaling radio bearer may extend between the RRC protocol layers 22, 44 of the MeNB 12 and the UE 36, respectively. The signaling radio bearer may be split in the first network node and a splitted portion of the signaling radio bearer may extend between MeNB 12 and the UE 36 via the SeNB 14. A first splitted portion of the signaling radio bearer between the MeNB 12 and the UE 36 may correspond to a first signaling radio bearer and the second splitted portion of the signaling radio bearer may correspond to a second signaling radio bearer. A protocol data unit corresponds to the PDU 48 illustrated in FIG. 2.

According to some embodiments, a mechanism may be provided which may enable to detect and discard duplicate PDCP PDUs for the reception procedure of SRBs distinguishing between copied duplicates and altered duplicates failing the integrity-validation procedure. In some embodiments, a first mechanism may be provided in which duplicate protocol data units may be detected by defining a maximum-delay window which may balance the ability to detect those duplicates and the ability to integrity-validate protocol data units received after subsequent transmission failures. In further embodiments, the above problem may be solved by an alternative second mechanism without a definition of reception windows but by invoking the integrity-validation procedure twice.

In the following embodiments related to the first mechanism will be described in more detail.

Figure 3:
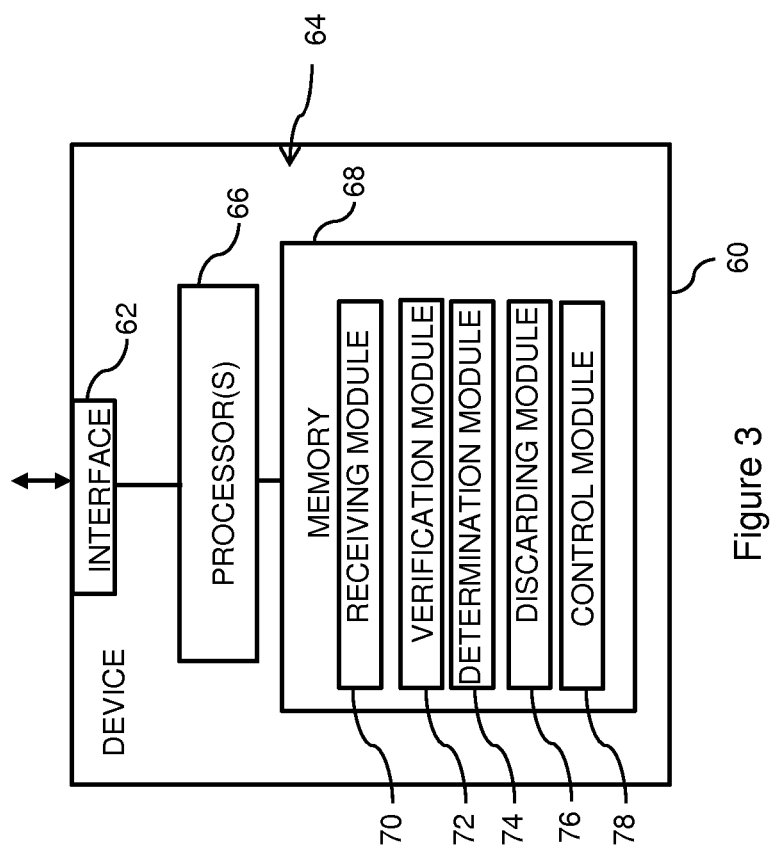
FIG. 3 is a block diagram illustrating a device according to an embodiment.

FIG. 3 shows a schematic diagram of a device 60 for a communication network and for discarding a duplicate protocol data unit associated with a data transmission via a first signaling radio bearer or a second signaling radio bearer according to an embodiment. The Figure illustrates an exemplary structure which may be used for implementing the concepts underlying the present embodiments in an user equipment, for example a terminal, a laptop or a PDA.

As shown in FIG. 3, the device 60 may include at least one interface 62 for bi-directionally communicating with the communication network, for example a radio interface suitable for wireless information exchange. In some scenarios, the device 60 may comprise one interface implementing receiving capabilities of the interface 62 in FIG. 3 and one different interface for implementing sending capabilities of the interface 62 in FIG. 3. As shown in FIG. 3, the device 60 comprises processing means 64 which may comprise at least one processor 66 coupled to the interface 62 and a memory 68 coupled to the one or more processors 66. The processing means 64 and therefore the device 60 may be operative to perform functionalities later described with reference to FIGS. 4 to 7. The memory 68 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 68 also includes instructions, for example suitably configured program code to be executed by the processor(s) 66 in order to implement the later described functionality of the device 60. This functionality will be referred to in the following as modules. It is noted that these modules do not represent or correspond to individual hardware elements of the device 60, but rather represent functionalities generated when the one or more processors 66 execute the suitably configured program code in the memory 68.

As shown in FIG. 3, the memory 68 may include suitably configured program code to implement a receiving module 70, a verification module 72, a determination module 74 and a discarding module 76. Further, the suitably configured program code in the memory 68 may also implement a control module 78 for implementing various control functionalities, e.g., for controlling the device 60 as to establishing and/or maintaining radio links for example via the first and second signaling radio bearers, or the like.

Figure 4:
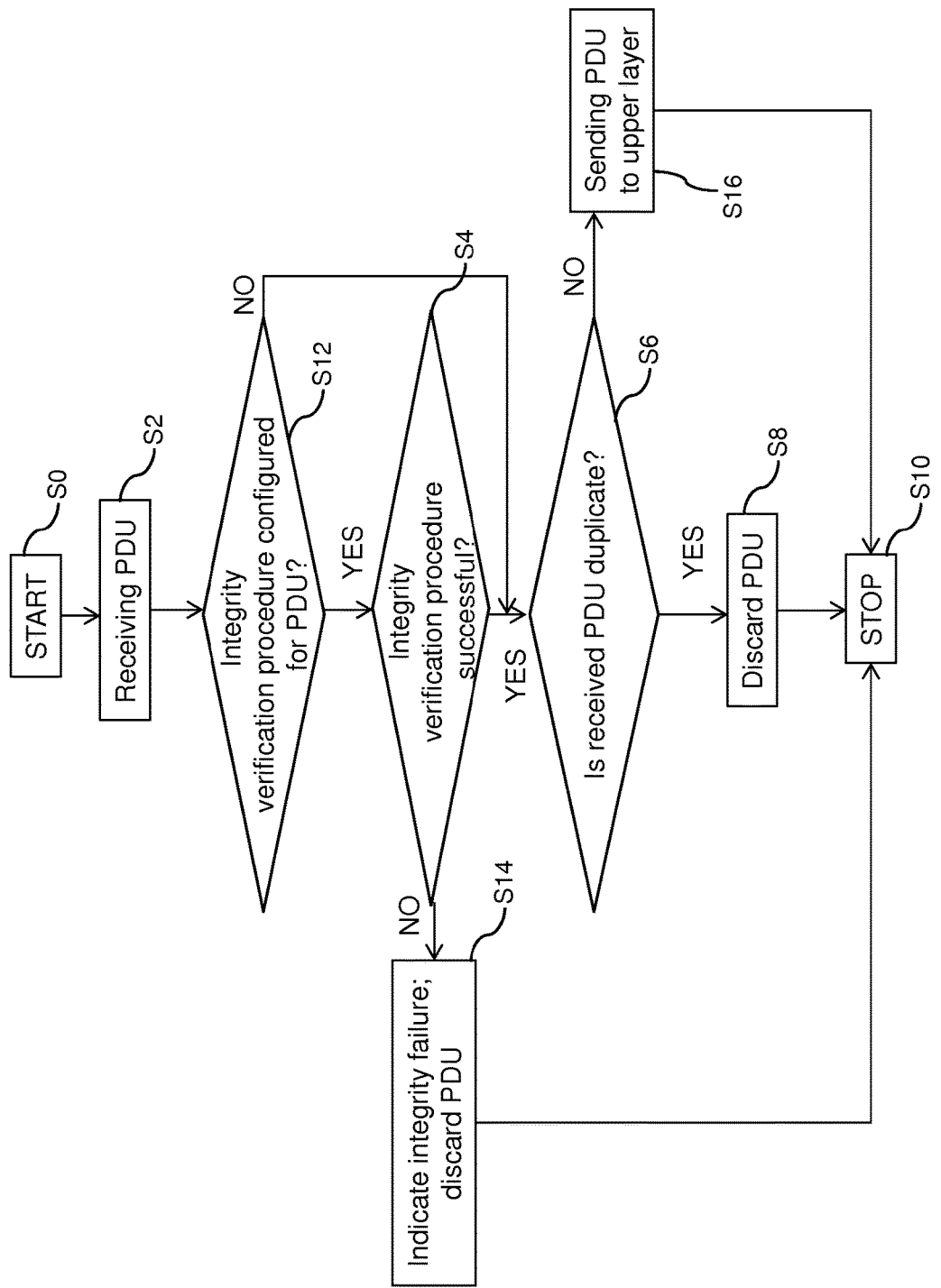
FIG. 4 is a flow chart illustrating a method for discarding a duplicate protocol data unit associated with a data transmission via a first signaling radio bearer or a second signaling radio bearer according to an embodiment.

FIG. 4 shows a flowchart illustrating an operation of the device 60 shown in FIG. 3. The method may start, as indicated by a block SO. In a first step S2 operationally performed by the receiving module 70 in cooperation with the at least one processor 66, a protocol data unit labeled throughout the Figures by "PDU" is received, for example via the interface 62 and/or by a respective protocol entity associated with a protocol layer in the device 60. In a further step S4 which may be operationally performed by the verification module 72 in cooperation with the at least one processor 66, an integrity of the received protocol data unit in an integrity verification procedure is verified. This step S4 may include a determination whether the integrity verification procedure is performed successfully for the received protocol data unit. In a further subsequent step S6 and in particular if the later determination is in the affirmative, there is performed a step S6 of determining whether the successfully integrity verified protocol data unit is a duplicate protocol data unit. This step S6 may be operationally performed by the determination module 74 in cooperation with the at least one processor 66. Thereupon, a further step S8, operationally performed by the discarding module 76 in cooperation with the at least one processor 66, the protocol data unit is discarded, if the successfully integrity verified protocol data unit is determined to be a duplicate protocol data unit. Thereupon the method may stop, as indicated by a block S10.

Accordingly, a discrimination between protocol data units and duplicate protocol data units may be performed downstream of a successfully performed integrity verification procedure for a received protocol data unit. A failure of the performed integrity verification procedure might be thus not indicated for an identified duplicate protocol data unit. Therefore the method may efficiently and easily achieve an accurate and reliable detection of a duplicate protocol data unit while not generating unnecessary and/or incorrect indications of integrity verification failures for duplicate protocol data units.

Further optional steps of the method in FIG. 4 are as follows: Between the step S2 of receiving the protocol data unit and the step S4 related to the integrity verification procedure, there may be performed a step S12 of determining whether the integrity verification procedure is applicable for the received protocol data unit. This step S12 may be operationally performed by the verification module 72, the determination module 74 or the control module 78, respectively, and the at least one processor 66. If the determination is in the affirmative, the step S4 related to the verification procedure may be performed. If the determination is not in the affirmative, the step S6 of determination whether the received protocol data unit is a duplicate protocol data unit is performed. If the integrity verification in the step S4 related to the integrity verification procedure is not in the affirmative or successful, a step S14 of indicating an integrity verification failure to one or more upper layers in the device 60 may be performed. Along with this indication, the integrity verification failed protocol data unit may be discarded. Both measures may be operationally performed by the control module 78 in cooperation with the at least one processor 66. If the determination whether the protocol data unit is a duplicate is not in the affirmative, there may be a step S16 performed in which the protocol data unit is sent to the one or more upper layers in the device 60. This step S16 may be also operationally performed by the control module 78 in cooperation with the at least one processor 60. The step S14 of indicating and the step S16 of sending can also be performed by a sending module providing functionalities related to sending information to a further protocol layer.

Bypassing the integrity verification procedure by means of the step S12 may enable a smooth processing of protocol data units without generation of unnecessary and/or incorrect indications of integrity verification failures. Indication of the failed integrity verification procedure and optionally the discard of the integrity failed protocol data unit in the step S16 may enable a smooth processing of fraudulently infiltrated protocol data units, i.e. PDUs fraudulently provided into the communication network by an interceptor. Sending the protocol data unit not determined to be a duplicate in the step S16 to the upper protocol layer may beneficially cause a further processing of the received protocol data unit in the device 60.

Figure 5:
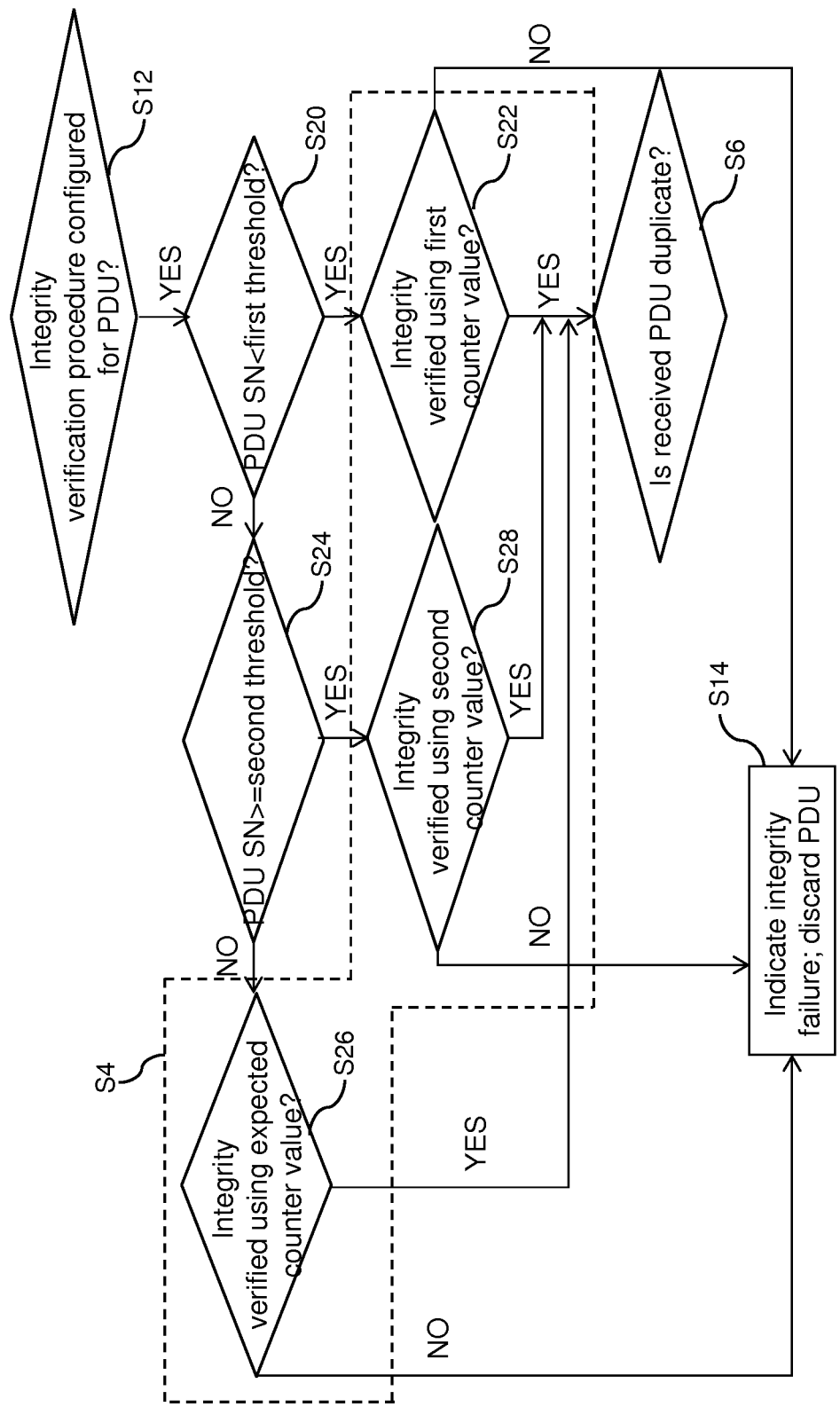
FIG. 5 is a flow chart illustrating a step of FIG. 4 which is related to determining whether an integrity verification procedure for a received protocol data unit is successful.

In FIG. 5, embodiments for the step S4 related to the verification procedure are described in more detail. In this embodiment, sequence numbers can be numbered by successive integer values from a minimum value, for example zero, to a maximum value. Upon reaching the maximum value a counter value of a counter associated with the numbering of the sequence numbers of successive protocol data units can be adapted to a further value and numbering of the protocol data units may restart from the minimum value. For example, the counter value can be incremented by a predetermined value, for example by an integer value such as one. In some embodiments, the counter may be embodied as Hyper Frame number HNF in LTE. A sending entity of a transmission link, for example the first network node, may successively number the protocol data units and may include information of the sequence number into, for example a header of, the protocol data unit. A receiving entity of the transmission link, for example the device 60, may derive an expected sequence number and an expected counter value for each received protocol data unit with respect to a sequence number of and optionally a counter value associated with the previously received and successfully integrity verified protocol data unit.

In a first optional step S20 of the method in FIG. 5, a sequence number of the received protocol data unit is compared with a first duplicate detection threshold. The first duplicate detection threshold can be defined by an expected sequence number for the received protocol data unit which is decreased by a predetermined value. As explained above, the expected sequence number can be determined by incrementing a sequence number by one up to a predefined maximum number of available sequence numbers for the received protocol data unit or by setting the expected sequence number to zero and incrementing a counter value of the counter, for example by one.

Hence, a reception window may be defined which may enable to identify a duplicate protocol data unit in a subsequent step S6 also after a predetermined maximum number of data units for which the transmission failed.

In some embodiments, the predetermined value may be a measure for a maximum accepted delay of a received protocol data unit to be detectable as a duplicate based on a sequence number of the received protocol data unit. In some embodiments, the predetermined value may be an integer value between at least 1 and at most 8, particularly between at least 2 and at most 7, and further particularly between at least 3 and at most 6. The predetermined value can be further particularly equal to five. Targeting the predetermined value towards the value of five may account for a delay of one or two sequence numbers between the first and second access nodes and may additionally ensure a transmission delay of the protocol data unit from the second access node via the second signaling radio bearer of one to three sequence numbers. In other words, the aforementioned intervals from which the value may be selected may allow for a robust possibility of identifying duplicate protocol data units being delayed compared to its expected arrival in the device 60. Reducing the breadth of the intervals may enable to target transmission in LTE associated with a typical delay of PDUs received via one of the signaling radio bearers compared to the other one and being measured in units of sequence numbers.

If the sequence number is smaller than the first duplicate detection threshold, a first counter value of the counter is used in the integrity verification procedure. The first counter value may be increased, for example by a value of one, compared to an expected counter value for the received protocol data unit. This counter value may correspond to RX_HNF+1. As explained above, the expected sequence number may be regarded as the next expected sequence number for the protocol data unit with respect to the sequence number of the previously received and successfully integrity verified protocol data unit. A respective sub-step S22 of the verification procedure is depicted in which it is determined, using the first counter value, whether the integrity of the received protocol data unit can be successfully verified. If this determination is in the affirmative, the step S6 of determining whether the received protocol data unit is a duplicate is performed. If the determination is not in the affirmative, the step S14 of indicating the integrity verification failure and discarding the protocol data unit is performed.

Hence, usage of the suitable counter value in the integrity verification procedure for the given reception window may be guaranteed, in order to enable duplicate protocol data units to successfully pass the integrity verification procedure.

If the sequence number is not smaller than the first duplicate detection threshold, the method may proceed to a step S24 in which the sequence number of the received protocol data unit is compared with a second duplicate detection threshold. The second duplicate detection threshold can be defined by the first duplicate detection threshold being increased by a predetermined value which value may correspond to a maximum value of available sequence numbers for a protocol data unit.

Hence, a further reception window may be defined which may enable to identify a duplicate protocol data unit in a subsequent step S6 also after a predetermined maximum number of data units for which the transmission failed.

If the sequence number may be equal to or may exceed the second duplicate detection threshold, a second counter value of the counter can be used in the integrity verification procedure. In this respect, the second counter value may be decreased, for example by a value of one, compared to the expected counter value for the received protocol data unit. This counter value may correspond to RX_HNF−1. A respective sub-step S26 of the integrity verification procedure is depicted in which it is determined, using the second counter value, whether the integrity of the received protocol data unit can be successfully verified. If this determination is in the affirmative, the step S6 of determining whether the received protocol data unit is a duplicate is performed. If the determination is not in the affirmative the step S14 of indicating the integrity verification failure and discarding the protocol data unit is performed.

Hence, usage of the suitable counter value in the integrity verification procedure for the given further reception window may be guaranteed, in order to enable duplicate protocol data units to successfully pass the integrity verification procedure.

If on the other hand the sequence number is smaller than the second duplicate detection threshold, the expected counter value of the counter can be used in the integrity verification procedure. A respective sub-step S26 of the integrity verification procedure is depicted in which it is determined, using the expected counter value, whether the integrity of the received protocol data unit can be successfully verified. If this determination is in the affirmative, the step S6 of determining whether the received protocol data unit is a duplicate protocol data unit is performed. If this determination is not in the affirmative, the step S14 of indicating the integrity verification failure and discarding the protocol data unit is performed.

Hence, a further reception window may be defined which enables to identify a duplicate in a subsequent step S6 also after a predetermined maximum number of data units for which the transmission failed.

It is noted that a sequence of the step S20 of comparing the sequence number of the received protocol data unit with the first duplicate determination threshold and the step S24 of the comparing the sequence number of the received protocol data unit with the second duplicate determination threshold can be reverse compared to the embodiment illustrated in FIG. 5. At least one of the steps S20, S24 of comparing the sequence number with the first and second duplicate determination threshold, respectively, can be operationally performed by the control module 76 in cooperation with the at least one processor 66 instead of the verification module 72 in cooperation with the at least one processor 66.

Figure 6A:
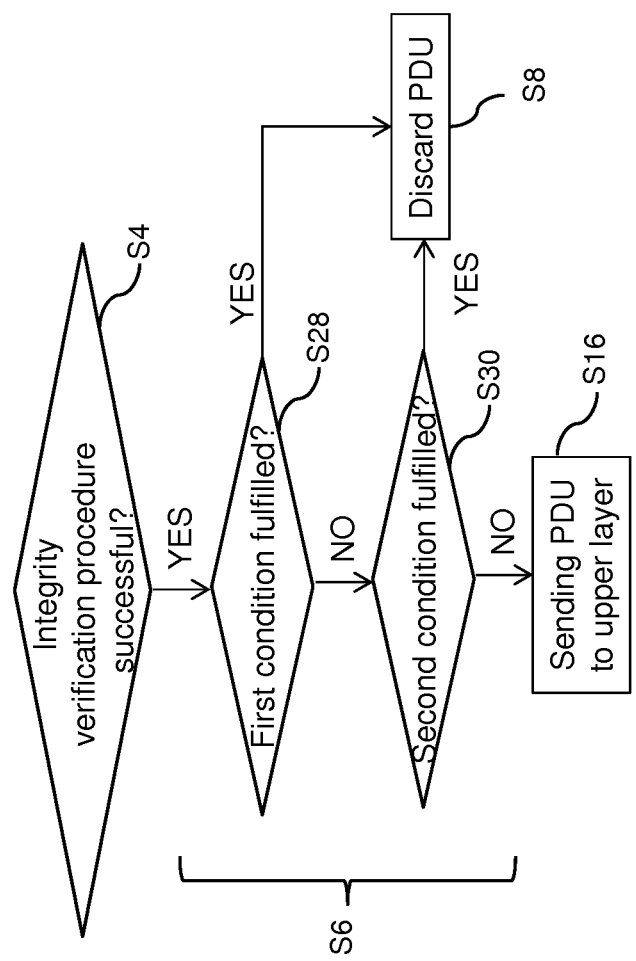
FIG. 6A is a flow chart illustrating an embodiment of a step of FIG. 4 which is related to determining whether the received protocol data unit is a duplicate protocol data unit.

In FIG. 6A, an embodiment of the step S6 of determining whether the received protocol data unit is a duplicate protocol data unit is depicted in more detail. In a first step S28, it is determined whether a first duplicate determination condition is fulfilled. The first duplicate determination condition may indicate whether the sequence number of the received protocol data unit is below the expected sequence number for the received protocol data unit and whether the sequence number of the received protocol data unit is equal to or above the first duplicate detection threshold. If the first duplicate determination condition is fulfilled, the determination is in the affirmative and the method proceeds to the step S8. Else, a further step S30 may be performed in which it is determined whether a second duplicate determination condition is fulfilled. The second duplicate determination condition indicates whether the sequence number of the received protocol data unit is equal to or above the second duplicate detection threshold. If the second duplicate determination condition is fulfilled, the determination is in the affirmative and the method proceeds to the step S8 of discarding the received protocol data unit. If the second duplicate determination condition is not fulfilled and the determination is thus not in the affirmative, the method may proceed to the step S16 of sending the received protocol data unit to the upper layers.

Figure 6B:
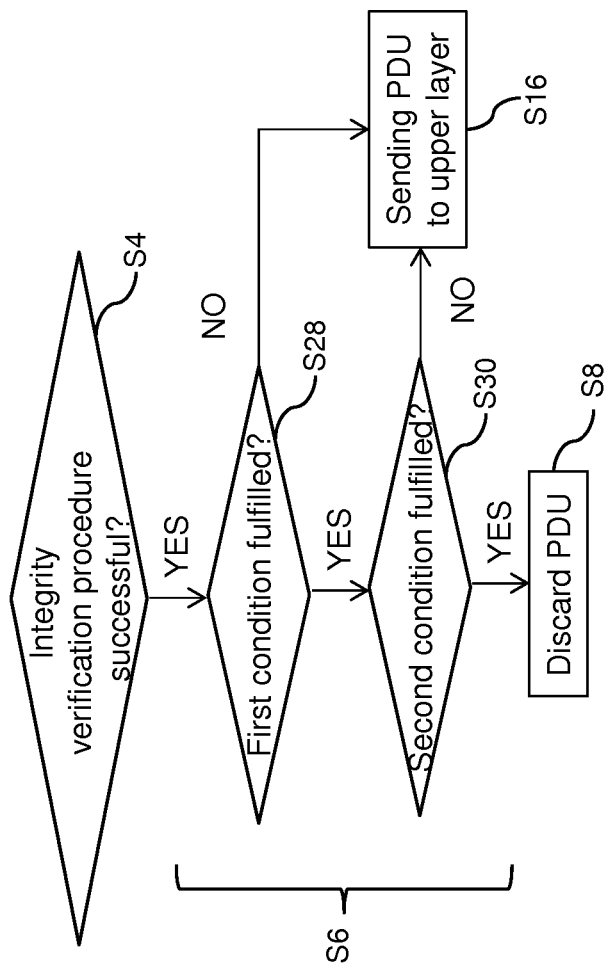
FIG. 6B is a flow chart illustrating a further embodiment of a step of FIG. 4 which is related to determining whether the received protocol data unit is a duplicate protocol data unit.

In FIG. 6B, a further embodiment of the step S6 of determining whether the received protocol data unit is a duplicate protocol data unit is depicted in more detail. In a first step S28, it is determined whether a first duplicate determination condition is fulfilled. The first duplicate determination condition may indicate whether the sequence number of the received protocol data unit is below the expected sequence number for the received protocol data unit and whether the sequence number of the received protocol data unit is equal to or above the first duplicate detection threshold. If the first duplicate determination condition is not fulfilled, the determination is not in the affirmative and the method proceeds to the step S16 of sending the received protocol data unit to the upper layers. Else, a further step S30 may be performed in which it is determined whether a second duplicate determination condition is fulfilled. The second duplicate determination condition indicates whether the sequence number of the received protocol data unit is equal to or above the second duplicate detection threshold. If the second duplicate determination condition is not fulfilled, the determination is not in the affirmative and the method proceeds to the step S16 of sending the received protocol data unit to the upper layers. If the second duplicate determination condition is fulfilled and the determination is thus in the affirmative, the method may proceed to the step S8 of discarding the received protocol data unit.

The step 28 of FIGS. 6A, 6B may each enable an accurate and reliable identification of duplicate protocol data units for a use case in which the actual sequence number of the received protocol data unit is lower than the expected number of the received protocol data unit. In this use case the predetermined value used in both the first duplicate detection threshold and the second duplicate detection threshold may be lower, higher, or equal to the expected sequence number of the received protocol data unit. On the contrary, the step 30 of FIGS. 6A, 6B enables an accurate and reliable identification of duplicate protocol data units for the use case in which the actual sequence number of the received protocol data unit may be higher or equal to the next expected sequence number of the received protocol data unit. This use case may occur when a wrap-around of the sequence number happened in the transmitter, hence the network node. In the step 30, the predetermined value used in the second duplicate detection threshold may only be higher than the expected sequence number of the received protocol data unit.

The steps S28, S30 related to the first and second duplicate determination condition can be performed in a reverse sequence compared to the sequence illustrated in FIG. 6A, 6B. Further, the method may comprise only one of the steps S28 and S30. Such an embodiment may apply both for FIGS. 6A, 6B. The method may also enable a robust identification of duplicate protocol data units, however, at the expense of missing one of the above mentioned uses cases.

The embodiments related to the above mentioned first mechanism may be based on a maximum delay-window for duplicates. These embodiments are able to integrity verify also duplicate received PDUs correctly by defining a maximum delay window for PDU duplicates, and afterwards to detect and discard these duplicates.

In some embodiments related to LTE, the receiving PDCP entity keeps track of the SN and HFN of the next expected PDU. After receiving an integrity-valid PDU, Next_PDCP_RX_SN is set to the received SN+1; if Next_PDCP_RX_SN is higher Maximum_PDCP_SN, it is reset to 0 and HFN is incremented by 1.

It might happen, however that a PDU transmission fail and do not get through to the PDCP receiving entity. In this case a HFN mismatch might happen, since a received PDU has been integrity protected with HFN+1, while the receiver assumes still HFN. Within the standardized procedure these mismatches, however, can be corrected by assuming HFN+1 in the receiver if the received SN is smaller than Next_PDCP_RX_SN (assumption that SN had been reset in the transmitter). This comparison can be considered as too loose, as usually far less than Maximum_PDCP_SN fail subsequently. For example, if Next_PDCP_RX_SN is 31, all received PDUs with SN 1 to 30 would be considered as PDUs received after 1 to 29 subsequent transmission failures. However, assuming that only maximum around 5 subsequent transmission failures can happen, considering SN 1, 2, 3, 4, 5 as PDUs received after those transmission failures is fairly sufficient.

The described embodiments exploit this circumstance. Only PDUs with SNs smaller than Next_PDCP_RX_SN-X are regarded as PDUs received after transmission failures (as well PDUs with PDCP SN>=Next_PDCP_RX_SN AND SN<Next_PDCP_RX_SN+Maximum_PDCP_SN-X). For all included cases the correct HFN is assumed for the integrity verification procedure. The remaining values are considered as duplicates, and the correct HFN is assumed for those as well. The relation of these conditions is illustrated in FIG. 7.

Figure 7:
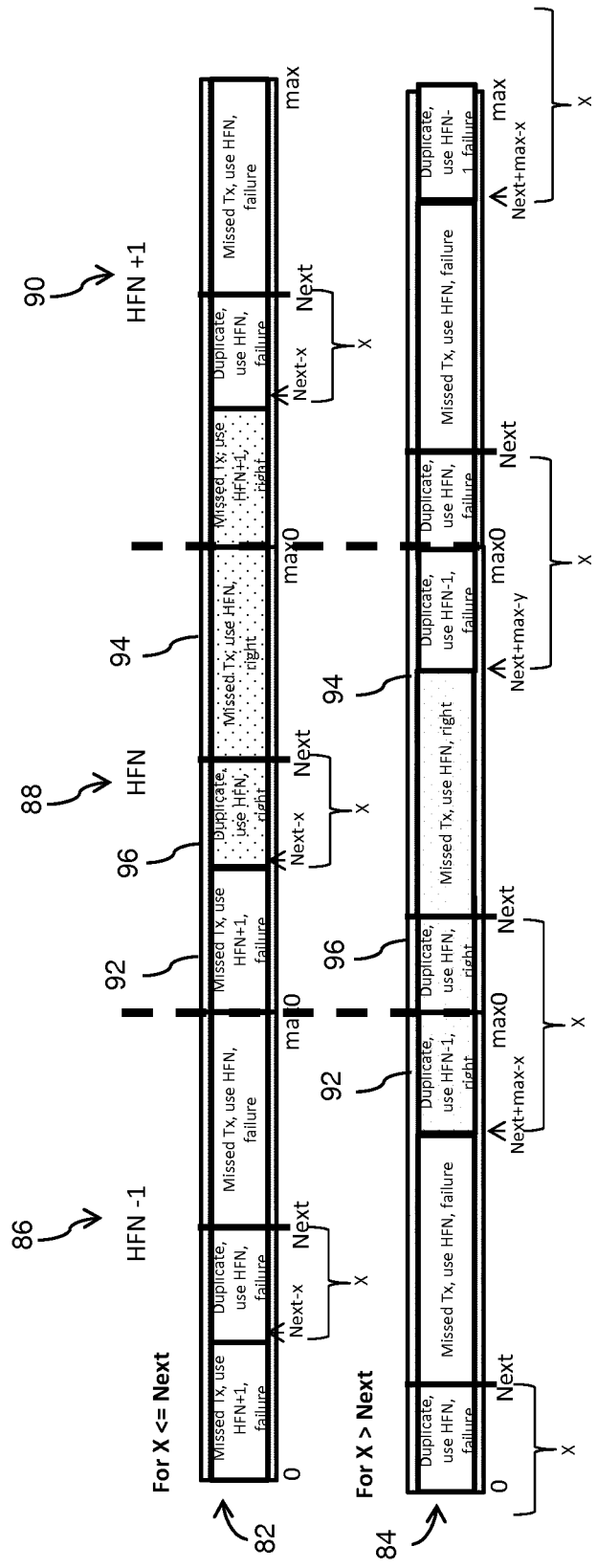
FIG. 7 is a diagram illustrating a determination of duplicate protocol data units from received protocol data units with respect to sequence numbers thereof according to an embodiment.

FIG. 7 may illustrate an arrangement 82, 84 of sequence numbers of successive PDUs in a case in which X may be equal or below the next expected sequence number of a received PDU (upper part of FIG. 7, indicated by "X<=Next", labeled as 82) and in a case in which X may be above the expected next sequence number of a received PDU (lower part of FIG. 7, indicated by "X>Next", labeled as 84). The sequence numbers of the PDUs are associated with portions 86-90 of the arrangement with each portion 86-90 may be for a different HFN value. In this respect, the portion 86 may be for a HFN−1, the portion 88 may be for a HFN and the portion 90 may be for a HFN+1. The corresponding sequence numbers count from zero to maximum (indicated in the Figure as "0" and "max"). The next expected sequence number may be labelled in the Figure by "Next". Based on the above defined method, different reception windows may be defined which may relate to transmission failures (indicated in the Figure by "missed Tx", and to duplicates (indicated in the Figure by "duplicate"). For illustration purposes, only the reception windows 92, 94 for the transmission failures and the reception window 96 for the duplicates are indicated. The used HFN to determine the count value used in the integrity verification procedure for the respective reception window 92-96 is indicated in the Figure by "use HFN", "use HFN−1", "HFN+1". The fulfilment of the above described first and second duplicate determination conditions may be indicated in the Figure by "failure" and "right" corresponding to logically false and true. An application of the above described first duplicate determination condition may correspond to portion 88 in the Figure, and an application of the above described second duplicate determination condition may correspond to the portion 86 of the Figure. It may become further obvious that the above described second duplicate determination condition may only be applicable in the lower part 84 of the Figure.

In case the integrity verification succeeds, duplicate detection is applied: If the SN falls into the duplicate detection window (i.e. PDCP SN<Next_PDCP_RX_SN and PDCP SN>=Next_PDCP_RX_SN−X; OR: received SN>=Next_PDCP_RX_SN+Maximum_PDCP_SN−X), as also illustrated in FIG. 7, the PDU is discarded. Otherwise the standardized procedure is followed. FIG. 7 shows a relation of reception windows as used in this embodiment. For example, the reception windows for correct duplicate detection for example are depicted as 96 and 92 in the Figure.

According to some embodiments, the parameter X can be defined as a maximum allowed delay, for example counted in sequence numbers (SNs), for PDUs to be detectable as duplicates. The higher the value of X is, the higher the allowed delay to detect PDUs as duplicates (for PDUs with HFN, while expected also HFN; and for PDUs with HFN−1, while expected is HFN), but also the lower the chance is to correct subsequent PDU transmission failures (for PDUs with HFN+1, while expected is HFN; and for PDUs with HFN, while expected is also HFN). The maximum number of subsequent transmission failures to be correctable is Maximum_PDCP_SN−X.

An exemplary example of a pseudo code implementing the above described embodiments can read as follows:

For SRBs, at reception of a PDCP Data PDU from lower layers, the UE shall:

as exceptional and very rare, but the correction Maximum_PDCP_SN−X=26 subsequent transmission failures is still possible. With these assumptions the following SNs would be regarded as duplicates, verification failures and correctly received PDUs, respectively:

For Next expected SN=0

| For HFN − 1: | 26 . . . 31: duplicates | rest failure |
|---|---|---|
| For HFN: | 0 . . . 25: correctly received | rest failure |
| For HFN + 1: | | all failure |

For Next expected SN=15

| For HFN − 1: | | all failure |
|---|---|---|
| For HFN: | 10 . . . 14 duplicates | rest correct |
| For HFN + 1: | 0 . . . 9 correctly received | rest failure |

For Next expected SN=31

| For HFN − 1: | | all failure | |
|---|---|---|---|
| For HFN: | 26 . . . 30 duplicates | 31 correct | rest failure |
| For HFN + 1: | 0 . . . 25 correctly received | rest failure | |

In the following embodiments related to the second mechanism may be described.

```
- if received PDCP SN < Next_PDCP_RX_SN − X:
   - decipher and verify the integrity of the PDU (if applicable) using COUNT based on RX_HFN + 1
     and the received PDCP SN as specified in the subclauses 5.6 and 5.7, respectively;
- else if received PDCP SN >= Next_PDCP_RX_SN + Maximum_PDCP_SN − X:
   - decipher and verify the integrity of the PDU (if applicable) using COUNT based on RX_HFN − 1
     and the received PDCP SN as specified in the subclauses 5.6 and 5.7, respectively;
- else:
   - decipher and verify the integrity of the PDU (if applicable) using COUNT based on RX_HFN
     and the received PDCP SN as specified in the subclauses 5.6 and 5.7, respectively;
- if integrity verification is applicable and the integrity verification is passed successfully; or
- if integrity verification is not applicable:
   - if received PDCP SN < Next_PDCP_RX_SN
       and received PDCP SN >= Next_PDCP_RX_SN − X; or
   - if received PDCP SN >= Next_PDCP_RX_SN + Maximum_PDCP_SN − X;
       - discard the received PDCP Data PDU
   - else
     - if received PDCP SN < Next_PDCP_RX_SN:
        - increment RX_HFN by one;
     - set Next_PDCP_RX_SN to the received PDCP SN + 1;
     - if Next_PDCP_RX_SN > Maximum_PDCP_SN:
        - set Next_PDCP_RX_SN to 0;
        - increment RX_HFN by one;
     - deliver the resulting PDCP SDU to upper layer;
- else, if integrity verification is applicable and the integrity verification fails:
   - discard the received PDCP Data PDU;
   - indicate the integrity verification failure to upper layer.
```

Figure 8:
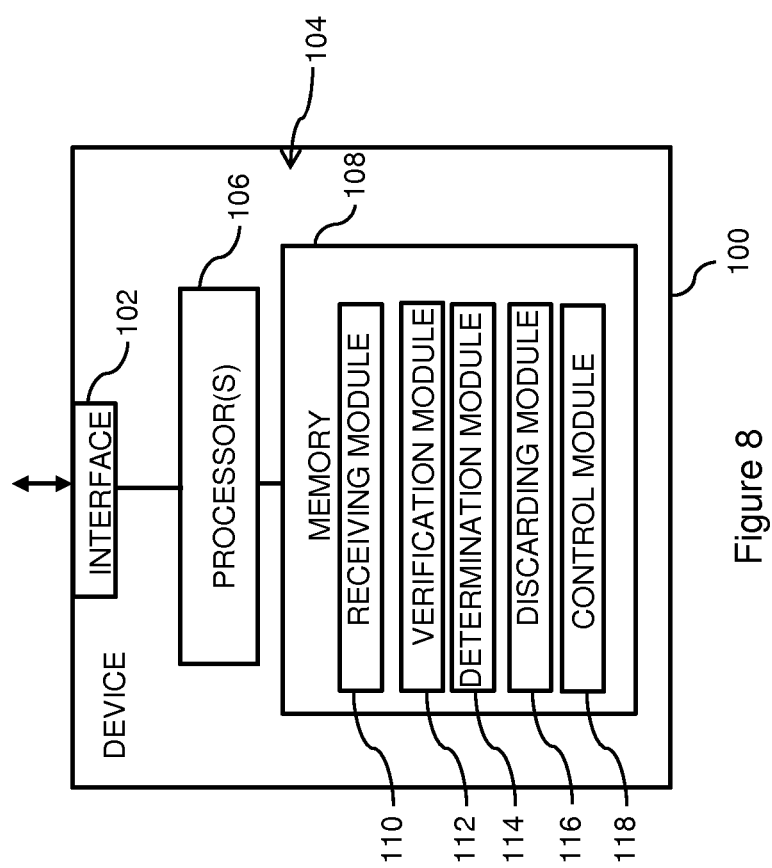
FIG. 8 is a block diagram illustrating a device according to a further embodiment.

In the following, exemplary examples are described, in order to illustrate the above embodiment based on the presented pseudo (code) case. It is assumed that the minimum value for the maximum available sequence numbers Maximum_PDCP_SN is equal to 31. Other values Maximum_PDCP_SN such as 127, 4095 or 32767 are also conceivable. Typically, an RRC procedure may take 20 Milliseconds (ms) and due to the request-response behavior of RRC, only one procedure is allowed at one time. Assuming a maximum delay of about 100 ms for a duplicate PDU to be received after the original PDU (for example a backhaul delay of about 50 ms plus an extra transmission delay of the SeNB link of about 50 ms), a typical value for X to detect those duplicates would be 5. Missing PDCP transmissions corresponding to RRC messages can be regarded FIG. 8 shows a schematic diagram of a device 100 for a communication network and for discarding a duplicate protocol data unit associated with a data transmission via a first signaling radio bearer or a second signaling radio bearer according to a further embodiment. The Figure illustrates an exemplary structure which may be used for implementing the concepts underlying the present embodiments in an user equipment, for example a terminal, a laptop or a PDA.

As shown in FIG. 8, the device 100 may include at least one interface 102 for bi-directionally communicating with the communication network, for example a radio interface suitable for wireless information exchange. In some scenarios, the device 100 may comprise one interface implementing receiving capabilities of the interface 102 in FIG. 8 and one different interface for implementing sending capabilities of the interface 102 in FIG. 8. As shown in FIG. 8, the device 100 comprises processing means 104 which may comprise at least one processor 106 coupled to the interface 102 and a memory 108 coupled to the one or more processors 106. The processing means 104 and therefore the device 100 may be operative to perform functionalities later described with reference to FIGS. 9 to 11. The memory 108 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 108 also includes instructions, for example suitably configured program code to be executed by the processor(s) in order to implement the later described functionality of the device 100. This functionality will be referred to in the following as modules. It is noted that these modules do not represent or correspond to individual hardware elements of the device 100, but rather represent functionalities generated when the one or more processors 106 execute the suitably configured program code in the memory 108.

As shown in FIG. 8, the memory 108 may include suitably configured program code to implement a receiving module 110, a verification module 112, a determination module 114 and a discarding module 116. Further, the suitably configured program code in the memory 108 may also implement a control module 118 for implementing various control functionalities, e.g., for controlling the device 100 as to establishing and/or maintaining radio links for example via the first and second signaling radio bearers, or the like.

Figure 9:
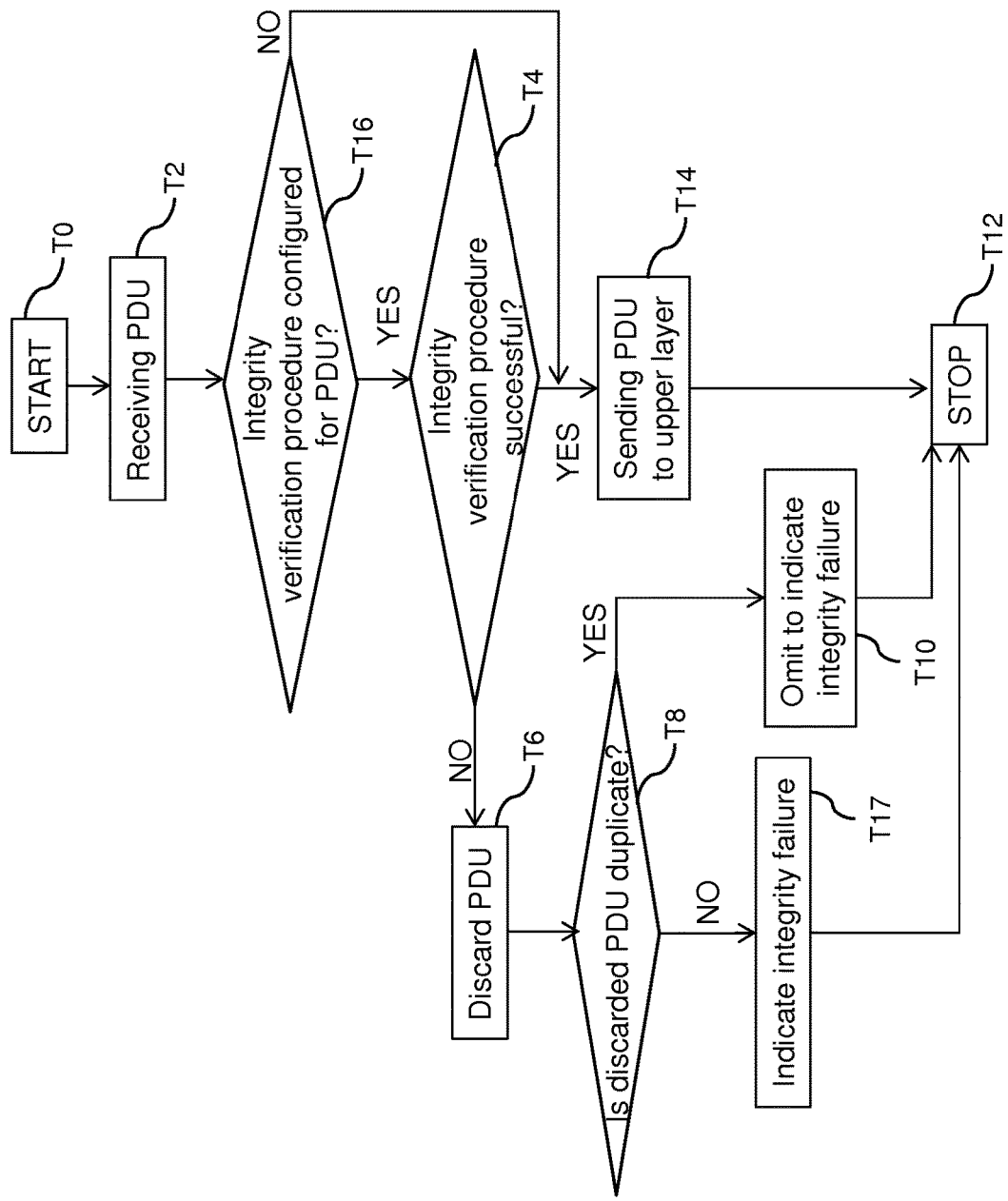
FIG. 9 is a flow chart illustrating a method for discarding a duplicate protocol data unit associated with a data transmission via a first signaling radio bearer or a second signaling radio bearer according to the further embodiment.

FIG. 9 shows a flowchart illustrating an operation of the device 100 shown in FIG. 8. The method may start, as indicated by a block T0. In a first step T2 of the method, for example operationally performed by the receiving module 110 in cooperation with the at least one processor 106, a protocol data unit is received. This step T2 may be similar to the step S2 of receiving illustrated in FIG. 4. In a further step T4, an integrity of the received protocol data unit is verified in an integrity verification procedure. This step T4 can be operationally performed by the verification module 112 in cooperation with the at least one processor 106. Thereupon, a step T6 of discarding the not successfully integrity verified protocol data unit is performed, for example by the discarding module 116 in cooperation with the at least one processor 106. Thereupon, operationally implemented by the determination module 114 in cooperation with the at least one processor 106, a step T8 of determining whether the discarded protocol data unit is a duplicate protocol data unit is performed. If the determination is in the affirmative and the discarded protocol data unit is determined to be a duplicate protocol data unit, a step T10 of omitting to indicate an integrity verification failure for the discarded protocol data unit is performed. This step T10 can be performed by the control module 118 or by a further sending module of the device which may implement functionalities related to sending data to one or more higher layers in the device. Thereupon the method may stop, as indicated by a block T12.

Accordingly, discrimination between protocol data units and duplicate protocol data units may be performed only for not successfully integrity verified protocol data units. Further, generation of an indication of an integrity verification procedure failure for such a duplicate protocol data unit may be avoided. Therefore the method may efficiently and easily achieve an accurate and reliable detection of a duplicate protocol data unit, while not generating unnecessary and/or incorrect indications of integrity verification failures for duplicate protocol data units.

Further optional steps of the method in FIG. 9 may include a step T14 of sending the received protocol data unit to the one or more upper layers in the device 100, if the integrity verification procedure may be successfully performed. Further, the method may include a step T16 related to determining whether the integrity verification procedure is applicable for the received protocol data unit. This step T16 may be operationally performed by the control module 118, the determination module 114 or the verification module 112, respectively, in cooperation with the at least one processor 106 and/or may be performed between the step T2 of receiving the protocol data unit and the step T4 related to the integrity verification procedure. If the determination is in the affirmative, the step T4 related to the verification procedure may be performed. Else the step T14 of sending the received protocol data unit to the upper layer(s) may be performed and the method may then stop. Further, if the received protocol data unit is determined to be not a duplicate protocol data unit, a further step T17 of indicating an integrity verification failure to the upper layer(s) may be performed. This step T17 may be operationally performed by the control module 118, the verification module 112 or the sending module, respectively, in cooperation with the at least one processor 106 and the method may then stop.

Sending the successfully integrity verified protocol data unit in the step T14 to the upper protocol layer may beneficially cause a further processing of the received protocol data unit in the device 100. Bypassing the integrity verification procedure by means of the step T16 may enable a smooth processing of protocol data units without generation of unnecessary and/or incorrect indications of integrity verification failures. Indication of the failed integrity verification procedure in the step T17 may enable a smooth processing of fraudulently infiltrated protocol data units.

Figure 10:
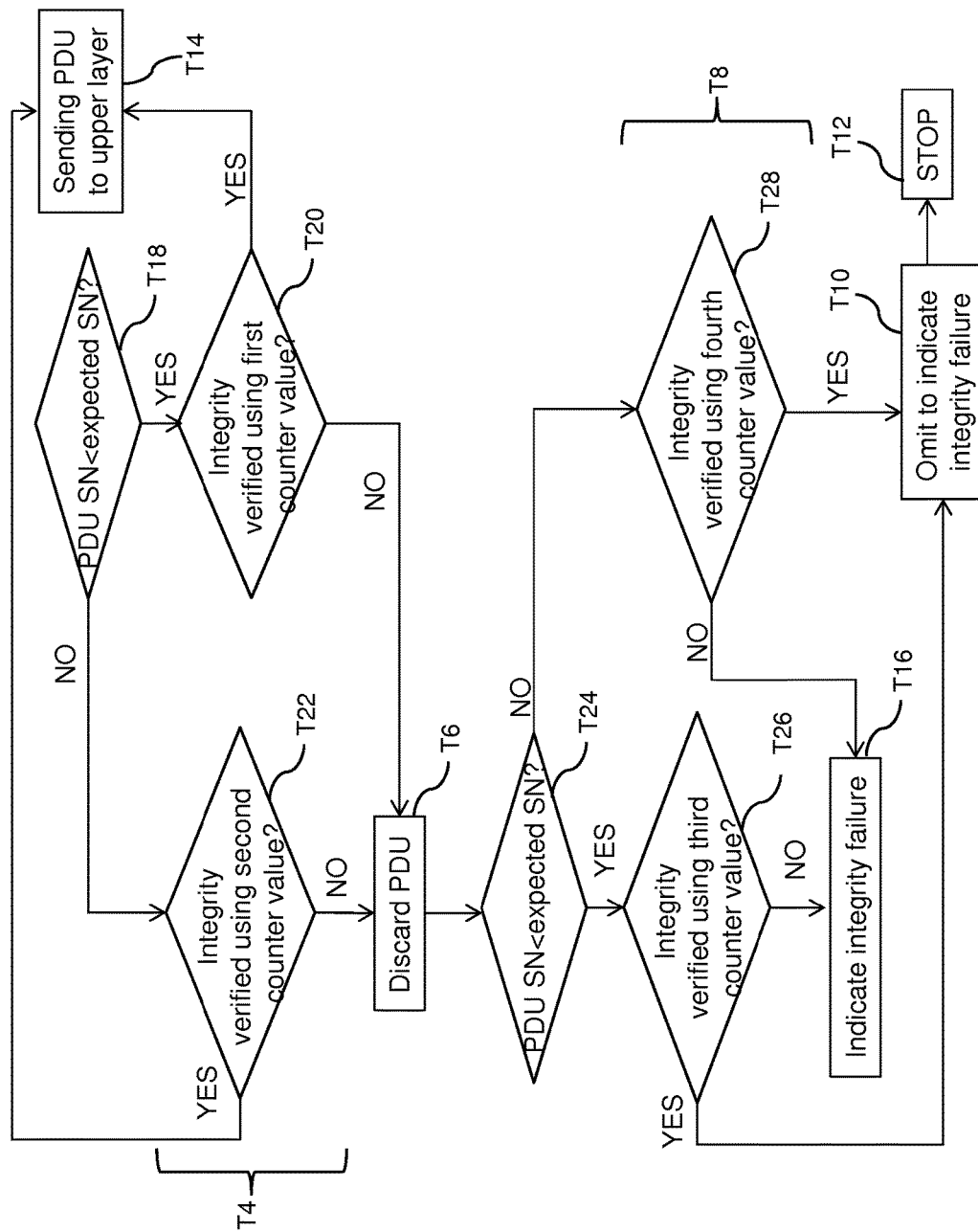
FIG. 10 is a flow chart illustrating a step of FIG. 9 which is related to determining whether an integrity verification procedure for a received protocol data unit is successful, and a further step of FIG. 9 which is related to determining whether the received protocol data unit is a duplicate protocol data unit.

In FIG. 10, embodiments related to the integrity verification procedure, particularly to the determination of the successfulness thereof in the step T4, and related to step T8 of determining whether the received protocol data unit is a duplicate protocol data unit are depicted in more detail. An underlying sequence numbering is similar as explained with reference to FIG. 5.

Prior to the step T4 related to the integrity verification procedure, a step T18 of comparing the sequence number of the received protocol data unit with the expected sequence number for the protocol data unit is performed. Thereupon, if the sequence number is smaller than the expected sequence number, a sub-step T20 of the integrity verification procedure is performed in which it is verified, using a first counter value of the counter, whether the integrity of the received protocol data unit can be verified successfully. Else a different sub-step T22 of the integrity verification procedure is performed in which it is verified, using a second counter value of the counter, whether the integrity of the received protocol data unit can be verified successfully. The first counter value may correspond to an increased counter value with respect to the expected counter value for the discarded protocol data unit. For example, the first counter value is increased by one. This counter value may correspond to RX_HNF+1. The second counter value may correspond to the expected counter value, for example RX_HNF. If the verification in the steps T20, T22 is not successfully performed the protocol data unit will be discarded and else the protocol data unit is sent to the upper layer(s), both steps T6, T14 being explained with reference to FIG. 9.

The step of comparing can be performed by the control module 118, the determination module 114 or the verification module 112, respectively, in cooperation with the at least one processor 106.

The step T20, T22 may enable discrimination between protocol data units associated with a transmission failure on the one hand and fraudulently infiltrated protocol data units as well as duplicate protocol data units one the other hand. Usage of the suitable counter value in the integrity verification procedure depending on an expected sequence number may be guaranteed. In sum, the steps T18, T20, T22 may beneficially enable re-utilization of a conventional integrity verification procedure described in the "Background" section.

Subsequent to the step T6 of discarding the protocol data unit, the step T8 of determining will be performed. This step T8 may employ a further integrity verification procedure which may be similarly performed compared to the above explained verification procedure, however, may use different counter values. Prior to the further integrity verification procedure, a step T24 of comparing the sequence number of the discarded protocol data unit with the expected sequence number for the protocol data unit is performed. This step T24 may be performed between the steps T6, T8. Thereupon, if the sequence number is smaller than the expected sequence number, a sub-step T26 of the further integrity verification procedure is performed in which it is verified, using a third counter value of the counter, whether the integrity of the received protocol data unit can be verified successfully. Else a different sub-step T28 of the integrity verification procedure is performed in which it is verified, using a fourth counter value of the counter, whether the integrity of the received protocol data unit can be verified successfully. The third counter value may correspond to expected counter value, for example RX_HNF, and thus may be equal to the second counter value and the fourth counter value may a decreased counter value with respect to the expected counter value for the discarded protocol data unit. The fourth counter value may be decreased by one with respect to the excepted counter value, and may correspond to RX_HNF−1. If the integrity verification in the sub-steps T26, T28 is not successfully performed, the step T16 of indicating the integrity verification failure may be performed and else the step T10 of omitting of the indicating of the integrity verification failure may be performed.

The step of comparing T24 can be performed by the control module 118, the determination module 114 or the verification module 112, respectively, in cooperation with the at least one processor 106.

The determination in the step T8 may be effectively performed using a further integrity verification procedure with suitable counter values, in order to distinguish duplicate protocol data units from fraudulently infiltrated.

Figure 11:
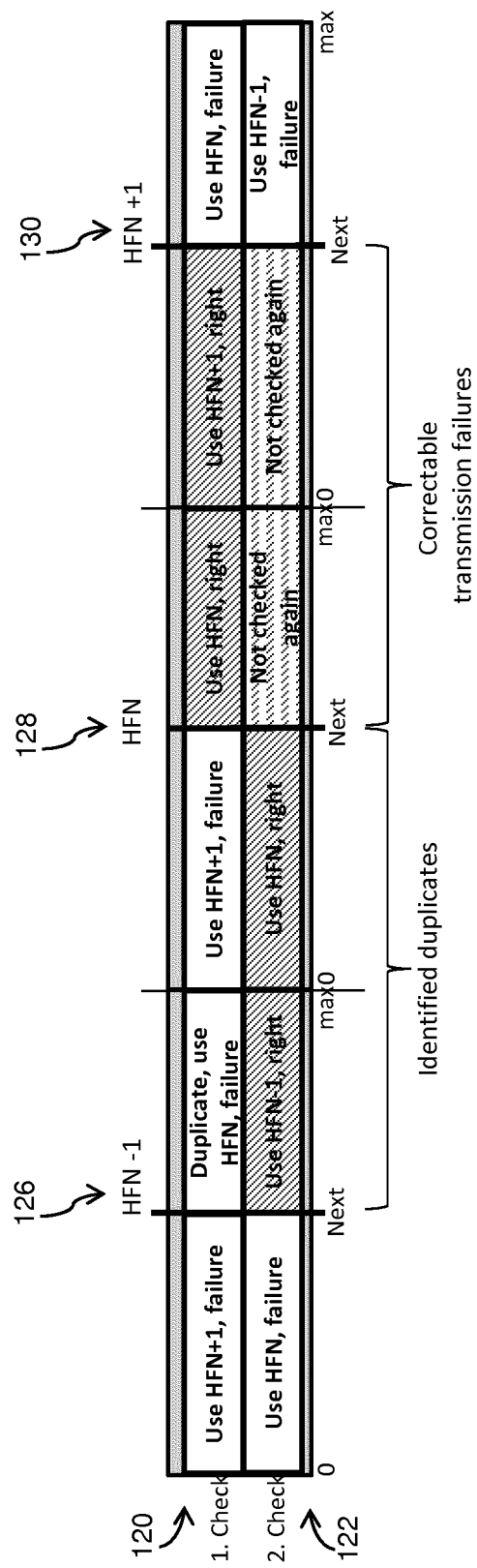
FIG. 11 is a diagram illustrating a determination of duplicate protocol data units from received protocol data units with respect to sequence numbers thereof according to a further embodiment.

In some embodiments the second mechanism may rely on a second integrity verification or check for the received protocol data unit. According to some embodiments, two subsequent integrity verification procedures may be performed. For example, the standardized procedure according to TS 36.323 V11.2.0 (2013-03), section 5.1.2.2 is followed first, i.e. a first integrity verification procedure is performed, and then in case the first integrity verification procedure fails, the received PDU is discarded in any case, but the verification failure indication is only sent if the received PDU cannot pass a second subsequent second verification procedure. For this second verification procedure, different assumptions regarding HFN are made, as described in the later presented pseudo-code example. FIG. 11 illustrates a detection of duplicate detected SNs and correctable transmission failures.

In this respect, FIG. 11 may illustrate arrangements 120, 122 of sequence numbers of PDUs for different portions 126, 128, 130 of the arrangements 120, 122 with successive HFNs (indicated in the Figure by "HFN−1", "HFN", "HFN+1"). The corresponding sequence numbers count from zero to maximum (indicated in the Figure as "0" and "max"). The first arrangement 120 may be associated with an application of the first integrity verification procedure indicated in the Figure by "1. Check", and the second arrangement 122 may be associated with an application of the further verification procedure indicated in the Figure by "2. Check". The HFN value used in the respective integrity verification procedure may be indicated by "Use HFN", "Use HFN−1" and "Use HFN+1". Further, a successfulness or non-successfulness of the integrity verification procedure and the second integrity verification procedure may be indicated by "right" and "failure", respectively, which indication may correspond to a logical true or false. As can be seen from FIG. 11, the received PDUs successfully verified in the first integrity verification procedure may represent correctable transmission failures (diagonally striped boxes in the arrangement 120). These PDUs might not be considered in the further integrity verification procedure illustrated in the arrangement 122 (indicated in the Figure by "Not checked again"). The not successfully verified PDUs may undergo the further integrity verification procedure. In case the further verification procedure may be successful, the corresponding PDUs are identified as duplicates, as indicated in the Figure by "Identified duplicates" (diagonally striped boxes in the arrangement 122). The not successfully verified PDUs may relate to fraudulently infiltrated PDUs.

In FIG. 11, the assumed HFN for the first and second integrity verification is illustrated with the outcome of the verification for different received SNs and HFNs corresponding to the received PDU. As illustrated for the first integrity verification, only received PDUs pass the test if they either have SN higher or equal Next_PDCP_RX_SN and correspond to HFN, or have SN lower Next_PDCP_RX_SN but correspond to HFN+1. The second integrity verification, however, passes also for protocol data units that failed the first integrity verification test, which uses different assumptions regarding HFN, but only if these protocol data units are truly duplicates, i.e. have an unaltered content.

The aforementioned pseudo code example may read as follows:

For SRBs, at reception of a PDCP Data PDU from lower layers, the UE shall:

- if received PDCP SN < Next_PDCP_RX_SN:
    - decipher and verify the integrity of the PDU (if applicable) using COUNT based on RX_HFN + 1 and the received PDCP SN as specified in the subclauses 5.6 and 5.7, respectively;
- else:
    - decipher and verify the integrity of the PDU (if applicable) using COUNT based on RX_HFN and the received PDCP SN as specified in the subclauses 5.6 and 5.7, respectively;

-continued

- if integrity verification is applicable and the integrity verification is passed successfully; or
- if integrity verification is not applicable:
  - if received PDCP SN < Next_PDCP_RX_SN:
    - increment RX_HFN by one;
  - set Next_PDCP_RX_SN to the received PDCP SN + 1;
  - if Next_PDCP_RX_SN > Maximum_PDCP_SN:
    - set Next_PDCP_RX_SN to 0;
    - increment RX_HFN by one;
  - deliver the resulting PDCP SDU to upper layer;
- else, if integrity verification is applicable and the integrity verification fails:
  - discard the received PDCP Data PDU;
  - if received PDCP SN < Next_PDCP_RX_SN:
    - decipher and verify the integrity of the PDU (if applicable) using COUNT based on RX_HFN and the received PDCP SN as specified in the subclauses 5.6 and 5.7, respectively;
  - else:
    - decipher and verify the integrity of the PDU (if applicable) using COUNT based on RX_HFN − 1 and the received PDCP SN as specified in the subclauses 5.6 and 5.7, respectively;
  - if integrity verification is not passed successfully
    - indicate the integrity verification failure to upper layer.

At least one of the following technical effects and advantages may be achieved by the herein described embodiments: It may be enabled to provide an accurate duplicate detection and accordingly discard for the PDCP reception procedure of SRBs, while avoiding incorrect indications of integrity verification failures in case of received PDCP PDU duplicates. This functionality may allow duplicate transmission of RRC messages as envisaged for dual connectivity in Rel-12 or later Releases, which may increase the signaling and mobility robustness in LTE.

Embodiments of the invention described with reference to FIGS. 4 to 7 may enable an accurate duplicate detection in a mechanism only employing one integrity verification procedure and requiring therefore modest computation efforts. The integrity verification procedure may, however, include a complex form due to introduction of the predetermined value.

Embodiments of the invention described with reference to FIGS. 8 to 11 may enable an accurate duplicate detection in a mechanism employing two successive integrity verification procedures, being easily describable by means of a pseudo-code representation and requiring therefore higher computation efforts compared to the embodiments described with reference to FIGS. 4 to 7.

Modifications and other embodiments of the disclosed embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation. The description of the embodiments with reference to 3GPP may not exclude the described embodiments being applicable in other communication networks and/or technologies, the networks and/or technologies being different from the mentioned protocols.

The invention claimed is:

1. A method for discarding a duplicate protocol data unit associated with data transmission via a first signaling radio bearer or a second signaling radio bearer, the method being performed by a device and the method comprising:
receiving a protocol data unit,
comparing a sequence number of the received protocol data unit with a first duplicate detection threshold,
comparing the sequence number of the received protocol data unit with a second duplicate detection threshold, when the sequence number is equal to or above the first duplicate detection threshold,
verifying an integrity of the received protocol data unit in an integrity verification procedure based on the comparison of the sequence number with the first duplicate detection threshold and the second duplicate detection threshold,
determining that the integrity of the received protocol data unit is not successfully verified,
in response to the determination, discarding the received protocol data unit,
determining whether the discarded protocol data unit is a duplicate protocol data unit,
if it is determined that the discarded protocol data unit is a duplicate protocol data unit, not indicating an integrity verification failure, and
if it is determined that the discarded protocol data unit is not a duplicate protocol data unit, indicating an integrity verification failure to one or more upper layers.

2. The method according to claim 1,
wherein, responsive to a determination that the sequence number is smaller than the first duplicate detection threshold, a first counter value of a counter associated with an expected sequence number for respective received protocol data units is used in the integrity verification procedure, the first counter value being increased compared to an expected counter value for the received protocol data unit.

3. The method according to claim 2, wherein the first duplicate detection threshold is defined by an expected sequence number for the received protocol data unit being decreased by a predetermined value.

4. The method according to claim 3, wherein the predetermined value is a measure for a maximum accepted delay of a received protocol data unit to be detectable as a duplicate protocol data unit based on the sequence number of the received protocol data unit.

5. The method according to claim 3, wherein the predetermined value is an integer value between at least 1 and at most 8.

6. The method according to claim 2,
wherein, responsive to a determination that the sequence number is equal to or exceeds the second duplicate detection threshold, a second counter value of the counter is used in the integrity verification procedure, the second counter value being decreased compared to the expected counter value for the received protocol data unit.

7. The method according to claim 6, wherein the second duplicate detection threshold is defined by the first duplicate detection threshold being increased by a predetermined value corresponding to a maximum value of available sequence numbers for a protocol data unit.

8. The method according to claim 1, wherein the step of comparing the sequence number of the received protocol data unit with the first duplicate detection threshold is performed prior to the step of comparing the sequence number of the received protocol data unit with the second duplicate detection threshold.

9. The method according to claim 6, wherein the step of determining whether the discarded protocol data unit is a duplicate protocol data unit comprises:
determining whether a first duplicate determination condition is fulfilled, the first duplicate determination condition indicating whether the sequence number of the received protocol data unit is below the expected sequence number for the received protocol data unit and whether the sequence number of the received protocol data unit is equal to or above the first duplicate detection threshold, and wherein the received protocol data unit is a duplicate protocol data unit, if the first duplicate determination condition is fulfilled.

10. The method according to claim 9, wherein the step of determining whether the discarded protocol data unit is a duplicate protocol data unit further comprises:
determining whether a second duplicate determination condition is fulfilled, the second duplicate determination condition indicating whether the sequence number of the received protocol data unit is equal to or above the second duplicate detection threshold, and wherein the received protocol data unit is a duplicate protocol data unit, if the second duplicate determination condition is fulfilled.

11. The method according to claim 1, wherein the step of determining whether the discarded protocol data unit is a duplicate protocol data unit comprises verifying the integrity of the discarded protocol data unit in a further integrity verification procedure.

12. The method according to claim 11, further comprising:
comparing the sequence number of the received protocol data unit with an expected sequence number for the protocol data unit,
wherein a first counter value of a counter associated with a sequence number of respective received protocol data units is used in the further integrity verification procedure, responsive to a determination that the sequence number is smaller than the expected sequence number, and else a second counter value of the counter is used in the further integrity verification procedure.

13. The method according to claim 12, wherein the first counter value is an expected counter value for the discarded protocol data unit and the second counter value is a decreased counter value with respect to the expected counter value.

14. The method according to claim 12, further comprising:
comparing the sequence number of the received protocol data unit with the expected sequence number for the protocol data unit, wherein a third counter value of the counter is used in the further integrity verification procedure, responsive to a determination that the sequence number is smaller than the expected sequence number, and else a fourth counter value of the counter is used in the further integrity verification procedure.

15. The method according to claim 14, wherein the third counter value is an increased counter value with respect to the expected counter value and the fourth counter value is the expected counter value.

16. A device for a communication network and for discarding a duplicate protocol data unit associated with data transmission via a first signaling radio bearer or a second signaling radio bearer, the device comprising:
an interface for communicating with the communication network, and
a processor coupled to the interface, wherein the processor is operative to:
receive a protocol data unit,
compare a sequence number of the received protocol data unit with a first duplicate detection threshold,
compare the sequence number of the received protocol data unit with a second duplicate detection threshold, when the sequence number is equal to or above the first duplicate detection threshold,
verify an integrity of the received protocol data unit in an integrity verification procedure based on the comparison of the sequence number with the first duplicate detection threshold and the second duplicate detection threshold,
determine that the integrity of the received protocol data unit is not successfully verified,
in response to the determination, discard the received protocol data unit,
determine whether the discarded protocol data unit is a duplicate protocol data unit,
if it is determined that the discarded protocol data unit is a duplicate protocol data unit, not indicate an integrity verification failure, and
if it is determined that the discarded protocol data unit is not a duplicate protocol data unit, indicate an integrity verification failure to one or more upper layers.

17. The device according to claim 16,
wherein, responsive to a determination that the sequence number is smaller than the first duplicate detection threshold, a first counter value of a counter associated with an expected sequence number for respective received protocol data units is used in the integrity verification procedure, the first counter value being increased compared to an expected counter value for the received protocol data unit.

* * * * *